Patented June 28, 1932

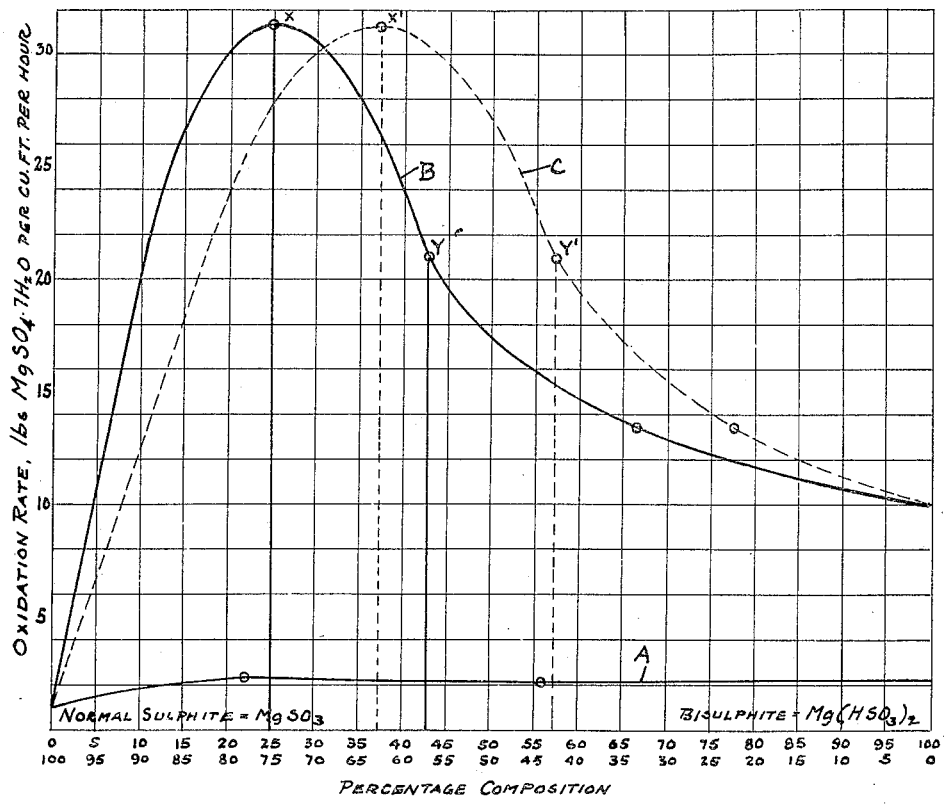

1,865,224

UNITED STATES PATENT OFFICE

ARTHUR W. WINSTON AND IVAN A. KENAGA, OF MIDLAND, MICHIGAN, ASSIGNORS TO THE DOW CHEMICAL COMPANY, OF MIDLAND, MICHIGAN, A CORPORATION OF MICHIGAN

METHOD OF MAKING MAGNESIUM SULPHATE

Application filed March 5, 1929. Serial No. 344,195.

In the manufacture of magnesium sulphate by the direct oxidation of magnesium sulphite with air, it has been variously proposed to carry out the oxidation step in a solution of normal magnesium sulphite, $MgSO_3$, or of magnesium bisulphite, $Mg(HSO_3)_2$, or one containing both the normal and acid sulphites together. In a previous patent application Serial No. 134,480 filed Sept. 9, 1926, we have disclosed a process wherein a magnesium sulphite-bisulphite liquor is prepared by absorbing $SO_2$ in an aqueous suspension of $Mg(OH)_2$, adjusting the composition of the resulting liquor so that the normal sulphite constitutes from 40 to 50 per cent of the total sulphite present, and then oxidizing the sulphite-bisulphite mixture to sulphate by blowing with air. The oxidation step is carried out in the presence of a catalyst which has the effect of greatly accelerating the rate of oxidation. As catalyst iron compounds, e. g. iron hydroxide, or compounds of cobalt or manganese may be used.

The present application, which is a continuation in part of the aforesaid pending application, has for its object to describe more particularly the conditions that we have found essential to the most efficient working of the process in question. Other objects will appear as the description proceeds. To the accomplishment of the foregoing and related ends, the invention, then, consists of the steps hereinafter fully described and particularly pointed out in the claims, the annexed drawing and following description setting forth in detail one suitable procedure whereby the principle of the invention may be used.

In said annexed drawing:—

The single figure is in the form of a chart containing various curves showing the relationship of the catalyst and of the composition of the magnesium sulphite-bisulphite mixture, respectively, to the oxidation rate.

Referring to the figure, curve A represents the oxidation rate, expressed as pounds of $MgSO_4.7H_2O$ produced per hour per cubic foot of solution, plotted against the molecular proportion of normal sulphite and bisulphite in the liquor, when the oxidation is carried out in the absence of iron compounds or other catalysts. Curve B, plotted in the same way, represents the oxidation rate in the presence of catalytic iron compounds, while the broken line curve C corresponds to curve B but the rate is plotted against the proportion by weight of normal sulphite and bisulphite. It is apparent that the catalytic effect induced by the addition of the iron compound very greatly increases the rate of oxidation.

It is also to be seen in operating with the catalyst that the oxidation rate is a minimum, about 1 pound per cubic foot per hour, when the solution or liquor contains normal sulphite, $MgSO_3$, only. As the proportion of bisulphite, $Mg(HSO_3)_2$, admixed with the normal sulphite in the liquor increases, the curve rises steeply to a maximum at about a molecular ratio of 25 per cent bisulphite and 75 per cent normal sulphite, i. e. 1 mole of the former to 3 moles of the latter. Thereafter, with increasing ratio of bisulphite to normal sulphite, the rate gradually diminishes to 10 pounds per cubic foot per hour at 100 per cent bisulphite. In curve C the same relationship is shown, but plotted as percentage by weight instead of molecular percentage. In consequence of the foregoing it is clearly demonstrated that oxidation proceeds extremely slowly in a solution of normal magnesium sulphite such that an excessive time factor would exist if the process were to be conducted under such condition. Without a catalyst, the oxidation rate is hardly perceptibly affected by the composition of the liquor, whether consisting of normal sulphite or bisulphite or of varying ratios of one to the other anywhere on the scale from 0 to 100 per cent. Quite otherwise, however, is the effect in the presence of the catalytic iron compound. Although the catalyst does not materially increase the oxidation rate when normal sulphite alone is present, the use thereof raises the oxidation rate for the bisulphite to ten times the rate for the normal sulphite, while at the optimum ratio of bisulphite to normal sulphite the rate is increased to over 30 times that for the normal sulphite alone. In other words, the activity of the catalyst is measureably influenced by the composition of the sulphite medium in which the reaction is carried out.

We have observed that the catalytic activity of the iron compound is a function of the acidity or alkalinity of the solution, and that the maximum of the oxidation curve apparently corresponds with the exact neutral point of the solution as determined by actual measurement of hydrogen ion concentation therein. To the left of the maximum, as the alkalinity increases the iron compound is progressively precipitated as ferric hydroxide, in which insoluble form it apparently exerts no material catalytic action. Just to the right of the maximum the solution becomes acid in reaction, and the dissolved iron compound, which at the maximum is largely in the ferric condition, tends to be reduced in consequence of the increasing concentration of bisulphite. As the acidity increases the reducing action of the solution becomes correspondingly greater with the result that the ferric iron compound is progressively reduced to the ferrous state, in which it is less active catalytically.

In carrying out our improved process it is desirable to maintain the ratio of bisulphite to normal sulphite as close to the maximum as possible. There are practical considerations, however, which affect the actual conduct of operations, largely residing in the fact that the composition of the liquor or solution is constantly changing as the alternate reactions of sulphiting and oxidation proceed in a continuous cycle. While the ratio of bisulphite to normal sulphite indicated by the maximum point of the curve establishes the most favorable condition for oxidation, this ratio changes as the oxidation progresses, as will be seen from the equations given below, so that the solution becomes more acid. Additions of magnesium hydrate may be made for the purpose of maintaining the optimum ratio, but even under close control a certain variation in composition of the solution cannot be practically avoided. Since a slight change in composition to the left of the maximum point on curve B results in a relatively great change in the oxidation rate, while the more gradual slope of the curve to the right permits of greater variation in the composition with less effect upon the oxidation rate, it is evident that an acid condition of the solution is less detrimental to the oxidation than an alkaline condition. Consequently during the oxidation the composition of the solution is preferably maintained between the maximum point X and a convenient point on the curve to the right, as for example the point Y, the limiting ratios of bisulphite to normal sulphite being 1 mole of the former to 3 moles of the latter at X, and 3 moles bisulphite to 4 moles normal sulphite at Y. The corresponding points on curve C are indicated at X' and Y', respectively. The invention, however, is intended to include operation with mixtures of bisulphite and normal sulphite in any other convenient proportions.

As regards the absorption of $SO_2$, this step is favored by an alkaline condition of the liquor, since obviously the more alkaline the liquor the more $SO_2$ can be absorbed in a given volume thereof. Accordingly the two principal stages of the process require to be controlled in such manner as to provide and maintain therein the conditions conducive to the most rapid rate of reaction.

In practice, accordingly, we proceed as follows in conducting our improved process. In a suitable vessel or tank is provided an aqueous suspension of magnesium hydroxide, $Mg(OH)_2$, containing about 1 to 2 per cent of iron hydroxide, based upon the weight of solids therein. Magnesium oxide or carbonate may also be used instead of the hydroxide, but somewhat less advantageously. This suspension is pumped over a suitably packed absorption tower, wherein the descending streams of the liquid pass in countercurrent to an ascending volume of $SO_2$ gas. Reaction takes place with absorption of $SO_2$ according to the equations:—

(1) $Mg(OH)_2 + SO_2 \rightarrow MgSO_3 + H_2O$
(2) $Mg(OH)_2 + 2SO_2 \rightarrow Mg(HSO_3)_2$

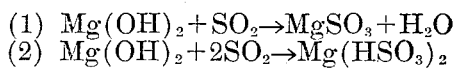

The relative quantities of $Mg(OH)_2$ and $SO_2$ admitted to the absorption tower determine the course of the reaction, Equation (2) obviously not becoming effective until sufficient $SO_2$ has first been supplied to satisfy Equation (1). The reacted liquor, having normally a distinctly acid reaction, is returned from the base of the tower to the tank, where an additional quantity of $Mg(OH)_2$ is added thereto, so as to adjust the composition between the desired limits as hereinbefore described.

Simultaneously with the circulation of the liquor from the tank over the absorption tower, oxidation is effected by blowing the contents of the tank with a large volume of air introduced under suitable pressure thereinto through a suitable distributor placed preferably near the bottom of the tank. Oxidation takes place in accordance with Equations (3) and (4);

(3) $2MgSO_3 + O_2 \rightarrow 2MgSO_4$
(4) $Mg(HSO_3)_2 + O_2 \rightarrow MgSO_4 + H_2O + SO_2$

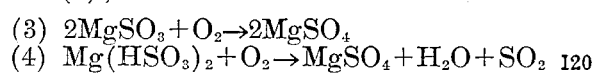

The $SO_2$ liberated according to Equation (4) combines with normal sulphite present to form bisulphite, as in Equation (5);

(5) $MgSO_3 + H_2O + SO_2 \rightarrow Mg(HSO_3)_2$

We have found that the reaction according to Equation (3) proceeds relatively slowly regardless of the presence of a catalyst, as previously indicated, whereas oxidation of the bisulphite as in Equation (4) takes place comparatively readily when a catalyst is used. Consequently the oxidation step is believed to proceed in the main according to Equation (4), an equivalent of $SO_2$ being liberated which at once reacts with normal sulphite to reproduce the corresponding bisulphite, as long as normal sulphite is present. The oxidation, therefore, proceeds actually at the expense of the normal sulphite, and the relative acidity of the mixture increases as more and more of the sulphite is converted to sulphate. When normal sulphite becomes exhausted from the liquor, the oxidation is then accompanied by a loss of $SO_2$ which is blown out with a large excess of air employed. It is, therefore, important to maintain a sufficient quantity of normal sulphite in the liquor, by suitable addition of magnesium hydrate as already described, to combine with the $SO_2$ formed as well as for the purpose of maintaining a suitable sulphite-bisulphite ratio for facilitating the oxidation. The total concentration of sulphite and bisulphite in the liquor may be varied over a considerable range, for example from 1 to 15 pounds per cubic foot, but is preferably held between 2 and 6 pounds per cubic foot. It has been found that the temperature of the liquor in the tank adjusts itself more or less uniformly within the limits of 50° to 60° C. and, indeed, for the most part independently of the atmospheric temperature, due to the heat liberated in the oxidation of the sulphite. Variations incident to winter or summer temperatures, in practice, are compensated to a sufficient extent by the greater or lesser amount of evaporation of water accompanying the blowing of the liquor with air, and it has not been found necessary to employ artificial heating or cooling for maintaining suitable operating conditions.

Coincidentally with the oxidation the circulation of the liquor over the absorption tower is continuously maintained, additional magnesium hydrate being admixed with the discharge from the tank so that the liquor pumped to the tower is distinctly alkaline, preferably containing free $Mg(OH)_2$ in suspension as well as the normal sulphite dissolved therein. The sequence of operations just described is repeated until a sufficient concentration of $MgSO_4$ has accumulated in the solution. We have found that the oxidation rate is gradually diminished as the concentration of sulphate increases. Therefore, the process is expediently carried only to the point where the cost of the evaporation of the resulting solution approximately balances the loss of efficiency in the oxidation. Under usual operating conditions this point is reached when the gravity of the solution becomes about 23° Bé., corresponding to a content of about 18 per cent $MgSO_4$. Naturally, however, the final strength of the solution may be selected at any other desirable point. When the solution has reached the desired concentration of sulphate, the supply of $SO_2$ to the absorption tower is shut off and pumping of the liquor over the tower is discontinued. The blowing of the batch in the tank with air is continued until substantially all of the sulphite remaining therein has been oxidized to sulphate. During the final blowing of the solution, additions of $Mg(OH)_2$ are continued so as to maintain approximately the optimum ratio of bisulphite to normal sulphite until the total content thereof has been reduced to less than about one pound per cubic foot. From that point the oxidation is completed without further additions of $Mg(OH)_2$. The solution of $MgSO_4$ is then treated for precipitating the iron and manganese compounds, filtered and the clear filtrate evaporated to crystallize pure Epsom salts, $MgSO_4.7H_2O$. The mother liquors from the crystallization may advantageously be employed in making up the solution or suspension for a succeeding operation.

From the foregoing it becomes evident that various important advantages accrue to the process by maintaining in the liquor both normal sulphite and bisulphite. The latter, in the presence of the catalyst, is most readily oxidized to the sulphate, while the former serves to take up and conserve the $SO_2$ liberated by the oxidation of the bisulphite. Finally the presence of both compounds in the ratio comprised within the limits as already explained assures the greatest activity of the catalyst. Although the concurrent operation of the steps of absorption of $SO_2$ and oxidation has been described in the foregoing illustrative procedure, it is equally within the invention to conduct the aforesaid steps independently, if so desired. Likewise other means may be employed for effecting the oxidation of the sulphite-bisulphite mixture, although the simple blowing with air as described presents the greatest economic advantage.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. A method of making magnesium sulphate which comprises treating an aqueous suspension of magnesium hydroxide with sulphur dioxide in amount sufficient to form a solution containing a mixture of normal sulphite and acid sulphite, and oxidizing such sulphites to sulphate in the presence of a catalytic compound of a metal having an atomic weight between 54 and 59.

2. A method of making magnesium sulphate which comprises treating an aqueous suspension of magnesium hydroxide with sulphur dioxide in amount sufficient to form a solution containing a mixture of normal sulphite and acid sulphite, and oxidizing such sulphites to sulphate in the presence of a catalytic iron compound.

3. A method of making magnesium sulphate which comprises treating an aqueous suspension of magnesium hydroxide with sulphur dioxide in amount sufficient to form a solution containing a mixture of normal sulphite and acid sulphite, and oxidizing such sulphites to sulphate by blowing said solution with air in the presence of a catalytic compound of a metal having an atomic weight between 54 and 59.

4. A method of making magnesium sulphate which comprises treating an aqueous suspension of magnesium hydroxide with sulphur dioxide in amount sufficient to form a solution containing a mixture of normal sulphite and acid sulphite, and oxidizing such sulphites to sulphate by blowing said solution with air in the presence of a catalytic iron compound.

5. A method of making magnesium sulphate which comprises reacting between sulphur dioxide and magnesium hydroxide in aqueous suspension, adjusting the composition of the resulting solution so as to maintain a ratio of acid sulphite to normal sulphite between one mole of the former to 3 moles of the latter and 3 moles of the former to 4 moles of the latter, and oxidizing such mixture of sulphites to sulphate by passing air through said solution in the presence of a catalyst.

6. A method of making magnesium sulphate which comprises reacting between sulphur dioxide and magnesium hydroxide in aqueous suspension, adjusting the composition of the resulting solution so as to maintain a ratio of acid sulphite to normal sulphite between one mole of the former to 3 moles of the latter and 3 moles of the former to 4 moles of the latter, and oxidizing such mixture of sulphites to sulphate by passing air through said solution in the presence of an iron compound as catalyst.

7. In a method of making magnesium sulphate, the step which consists in oxidizing a mixture of acid and normal sulphites of magnesium in water by contacting the same with air in the presence of a catalytic iron compound.

8. In a method of making magnesium sulphate, the step which consists in oxidizing a mixture of acid and normal sulphite of magnesium in water by contacting the same with air in the presence of a catalytic compound of a metal having an atomic weight between 54 and 59.

9. In a method of making magnesium sulphate, the step which consists in oxidizing a mixture of acid and normal sulphites of magnesium in water, wherein the molecular ratio of acid sulphite to normal sulphite is maintained between $\frac{1}{3}$ and $\frac{3}{4}$, by passing air through such solution in the presence of a catalytic compound of a metal having an atomic weight between 54 and 59.

Signed by us this 25 day of February, 1929.
ARTHUR W. WINSTON.
IVAN A. KENAGA.